US 9,083,906 B2

(12) United States Patent
Nakamura et al.

(10) Patent No.: US 9,083,906 B2
(45) Date of Patent: Jul. 14, 2015

(54) A/D CONVERTER AND SOLID-STATE IMAGING APPARATUS WITH OFFSET VOLTAGE CORRECTION

(75) Inventors: Kohichi Nakamura, Kawasaki (JP); Hiroki Hiyama, Sagamihara (JP); Tetsuya Itano, Sagamihara (JP); Kazuhiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 13/591,903

(22) Filed: Aug. 22, 2012

(65) Prior Publication Data
US 2013/0068930 A1    Mar. 21, 2013

(30) Foreign Application Priority Data

Sep. 15, 2011 (JP) ................................. 2011-202335

(51) Int. Cl.
H04N 5/378      (2011.01)
H04N 5/3745     (2011.01)
G02F 7/00       (2006.01)

(52) U.S. Cl.
CPC ............ *H04N 5/378* (2013.01); *H04N 5/37455* (2013.01); *G02F 7/00* (2013.01)

(58) Field of Classification Search
CPC ....... H04N 5/37455; H04N 5/378; G02F 7/00
USPC ....... 250/214 C, 214 A, 214 G, 214.1, 214 R, 250/206; 348/571, 572; 386/327
See application file for complete search history.

(56) References Cited

U.S. PATENT DOCUMENTS

| | | |
|---|---|---|
| 4,815,027 A | 3/1989 | Tokumitsu et al. |
| 5,761,345 A | 6/1998 | Saito et al. |
| 6,104,832 A | 8/2000 | Saito et al. |
| 6,385,338 B1 | 5/2002 | Saito et al. |
| 6,605,850 B1 | 8/2003 | Kochi et al. |
| 6,670,990 B1 | 12/2003 | Kochi et al. |
| 6,946,637 B2 | 9/2005 | Kochi et al. |
| 6,960,751 B2 | 11/2005 | Hiyama et al. |

(Continued)

FOREIGN PATENT DOCUMENTS

| | | |
|---|---|---|
| CN | 101540607 A | 9/2009 |
| CN | 101610419 A | 12/2009 |

(Continued)

OTHER PUBLICATIONS

European Search Report dated Feb. 13, 2013, in counterpart European Application No. 12182125.0-1902.

*Primary Examiner* — Francis M Legasse, Jr.
(74) *Attorney, Agent, or Firm* — Fitzpatrick, Cella, Harper & Scinto

(57) ABSTRACT

Provided is an A/D converter including an input terminal, a reference signal line for supplying a reference signal which changes temporally, a comparator, a correction capacitor connected to an inverting input terminal of the comparator; and an output circuit which outputs digital data corresponding to an analog signal input to the input terminal. In a first state in which a total voltage of a first analog signal and an offset voltage of the comparator is held in the correction capacitor, a second analog signal input to the input terminal is supplied to a non-inverting input terminal of the comparator, and the second analog signal or the total voltage is changed using the reference signal, thereby outputting, from the output circuit, digital data.

11 Claims, 8 Drawing Sheets

(56) References Cited

U.S. PATENT DOCUMENTS

| | | |
|---|---|---|
| 7,110,030 B1 | 9/2006 | Kochi et al. |
| 7,193,747 B2 | 3/2007 | Saito |
| 7,385,172 B2 | 6/2008 | Inoue et al. |
| 7,429,764 B2 | 9/2008 | Koizumi et al. |
| 7,460,162 B2 | 12/2008 | Koizumi et al. |
| 7,518,539 B2 | 4/2009 | Han et al. |
| 7,528,878 B2 | 5/2009 | Sato et al. |
| 7,538,804 B2 | 5/2009 | Okita et al. |
| 7,547,871 B2 | 6/2009 | Hiyama et al. |
| 7,639,290 B2 | 12/2009 | Higuchi et al. |
| 7,671,908 B2 | 3/2010 | Lee ............................. 348/241 |
| 7,741,593 B2 | 6/2010 | Iwata et al. |
| 7,755,688 B2 | 7/2010 | Hatano et al. |
| 7,812,876 B2 | 10/2010 | Hiyama et al. |
| 7,825,974 B2 | 11/2010 | Itano et al. |
| 7,869,096 B2 | 1/2011 | Saito |
| 7,920,192 B2 | 4/2011 | Watanabe et al. |
| 7,961,237 B2 | 6/2011 | Hatano et al. |
| 7,978,241 B2 | 7/2011 | Koizumi et al. |
| 8,023,025 B2 | 9/2011 | Itano et al. |
| 8,063,351 B2 | 11/2011 | Kobayashi et al. |
| 8,063,958 B2 | 11/2011 | Okita et al. |
| 8,063,967 B2 | 11/2011 | Itano et al. |
| 8,081,245 B2 | 12/2011 | Itano et al. |
| 8,085,319 B2 | 12/2011 | Ono et al. |
| 8,159,577 B2 | 4/2012 | Iwata et al. |
| 8,174,604 B2 | 5/2012 | Shibata et al. |
| 8,208,055 B2 | 6/2012 | Hiyama |
| 8,218,050 B2 | 7/2012 | Ogura et al. |
| 8,269,872 B2 | 9/2012 | Okumura |
| 8,289,431 B2 | 10/2012 | Itano |
| 8,421,889 B2 | 4/2013 | Hiyama et al. ................ 348/272 |
| 8,427,565 B2 | 4/2013 | Hiyama |
| 2007/0182838 A1* | 8/2007 | Lee ............................. 348/308 |
| 2007/0216564 A1 | 9/2007 | Koseki ........................ 341/155 |
| 2008/0122454 A1* | 5/2008 | Kato ............................ 324/661 |
| 2008/0136948 A1 | 6/2008 | Muramatsu .................. 348/294 |
| 2008/0239106 A1 | 10/2008 | Sano ........................... 348/241 |
| 2009/0009635 A1 | 1/2009 | Maeda et al. ................ 348/241 |
| 2009/0167585 A1 | 7/2009 | Yeom |
| 2009/0190018 A1 | 7/2009 | Sakakibara |
| 2009/0201406 A1 | 8/2009 | Okita et al. |
| 2009/0310001 A1 | 12/2009 | Masuyama et al. |
| 2009/0322922 A1 | 12/2009 | Saito et al. |
| 2010/0060762 A1 | 3/2010 | Takada et al. |
| 2010/0060763 A1 | 3/2010 | Hiyama et al. |
| 2010/0149394 A1 | 6/2010 | Yamazaki et al. |
| 2010/0165164 A1 | 7/2010 | Muramatsu ................... 348/302 |
| 2010/0225796 A1 | 9/2010 | Lim et al. ..................... 348/308 |
| 2010/0314530 A1 | 12/2010 | Hiyama et al. |
| 2010/0328510 A1 | 12/2010 | Hiyama et al. |
| 2011/0013050 A1 | 1/2011 | Aruga et al. ................. 348/241 |
| 2011/0019025 A1 | 1/2011 | Koseki ........................ 348/222.1 |
| 2011/0141324 A1 | 6/2011 | Koseki ......................... 348/241 |
| 2011/0157441 A1 | 6/2011 | Okita et al. |
| 2011/0157447 A1 | 6/2011 | Watanabe et al. |
| 2011/0279723 A1 | 11/2011 | Takamiya et al. ............ 348/308 |
| 2012/0026371 A1 | 2/2012 | Itano et al. |
| 2012/0081586 A1 | 4/2012 | Itano et al. |
| 2012/0086841 A1 | 4/2012 | Ono et al. |
| 2012/0113284 A1 | 5/2012 | Okita et al. |
| 2012/0168610 A1 | 7/2012 | Iwata et al. |
| 2012/0217379 A1 | 8/2012 | Hiyama |
| 2012/0217603 A1 | 8/2012 | Koizumi et al. |
| 2013/0026343 A1 | 1/2013 | Saito et al. |
| 2013/0057742 A1 | 3/2013 | Nakamura et al. |
| 2013/0062503 A1 | 3/2013 | Saito et al. |
| 2013/0088292 A1 | 4/2013 | Maehashi et al. |
| 2013/0089320 A1 | 4/2013 | Hiyama et al. |
| 2013/0194474 A1 | 8/2013 | Hiyama et al. |

FOREIGN PATENT DOCUMENTS

| | | |
|---|---|---|
| CN | 101729806 A | 6/2010 |
| CN | 101978603 A | 2/2011 |
| EP | 2104235 A1 | 9/2009 |
| EP | 2182722 A2 | 5/2010 |
| JP | 2-052527 A | 2/1990 |
| JP | 2006-217245 A | 8/2006 |
| JP | 2008-067358 A | 3/2008 |
| JP | 2010-187238 A | 8/2010 |
| JP | 2011-211535 A | 10/2011 |

* cited by examiner

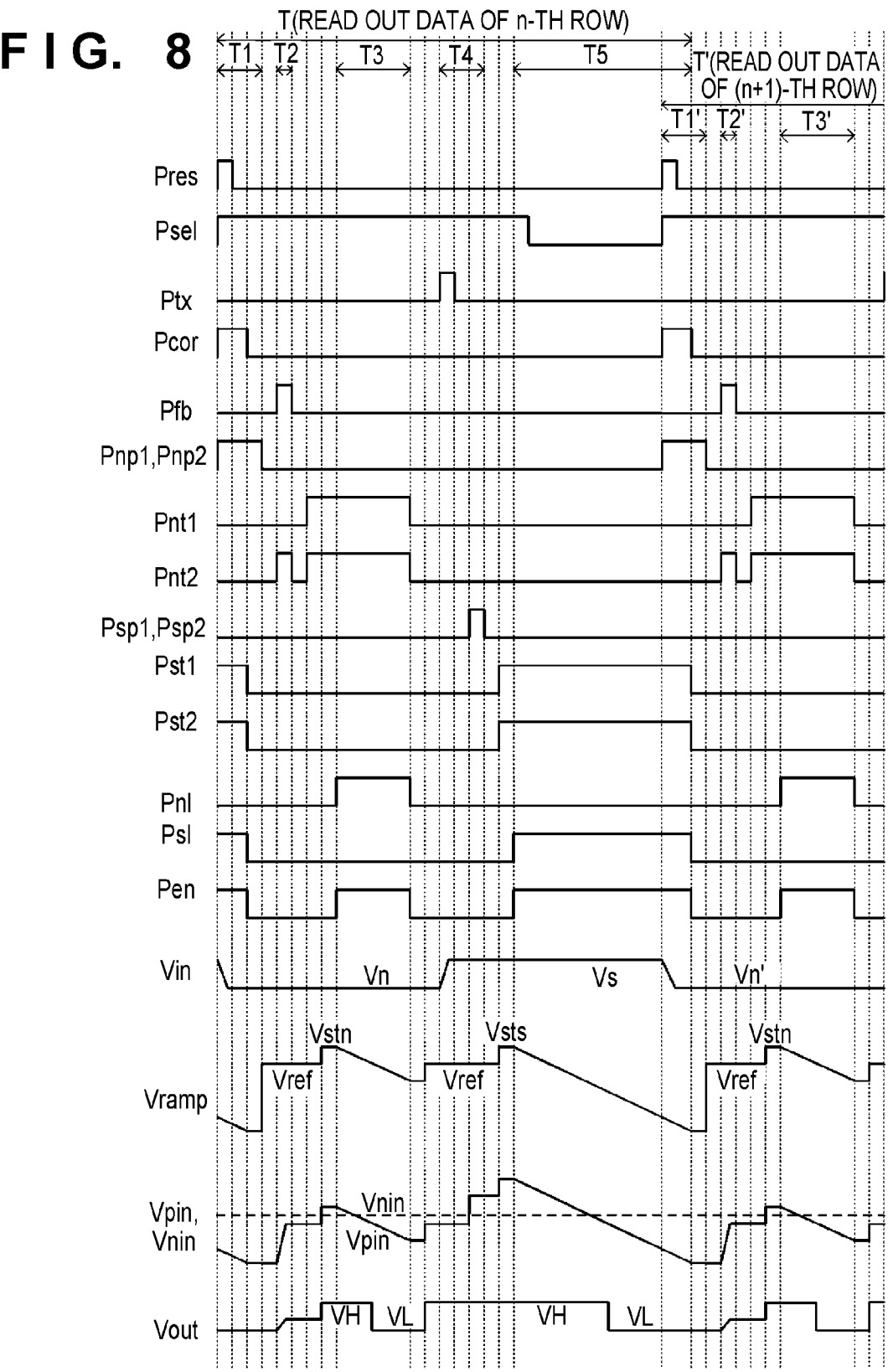

A/D CONVERTER AND SOLID-STATE IMAGING APPARATUS WITH OFFSET VOLTAGE CORRECTION

BACKGROUND OF THE INVENTION

1. Field of the Invention

The present invention relates to an A/D converter and solid-state imaging apparatus.

2. Description of the Related Art

A technique which arranges A/D converters in correspondence with columns of pixels arranged in an array and converts signals from the respective pixels into digital data in a solid-state imaging apparatus is known. However, since offset voltages of comparators included in the respective A/D converters are different, an A/D conversion period has to be set in consideration of a maximum value of the offset voltages. U.S. Pat. No. 7,671,908 has proposed a technique for correcting an offset voltage by feeding back an output of the comparator included in each individual A/D converter to an input of that comparator.

SUMMARY OF THE INVENTION

The technique of U.S. Pat. No. 7,671,908 uses a controller to feed back the output of the comparator to its input. For this reason, the circuit arrangement of the A/D converter is complicated, and noise caused by the controller adversely influences the output of each comparator. Hence, an aspect of the present invention provides a technique for correcting an offset voltage of a comparator of each A/D converter by a simple arrangement.

An aspect of the present invention provides an A/D converter comprising: an input terminal for inputting an analog signal; a reference signal line for connecting to a signal source that generates a reference signal which changes temporally; a comparator which includes a non-inverting input terminal, an inverting input terminal, and an output terminal, and outputs, from the output terminal, an output signal according to a comparison result between a voltage supplied to the non-inverting input terminal and a voltage supplied to the inverting input terminal; a correction capacitor connected to the inverting input terminal of the comparator; and an output circuit which outputs digital data corresponding to the analog signal input to the input terminal, wherein in a first state in which a total charge of a first analog signal and an offset voltage of the comparator is held in the correction capacitor, a second analog signal input to the input terminal is supplied to the non-inverting input terminal of the comparator, and the second analog signal supplied to the non-inverting input terminal of the comparator or the total charge held in the correction capacitor is changed using the reference signal, thereby outputting, from the output circuit, digital data depending on a time from the beginning of the change until the output signal of the comparator changes as digital data corresponding to the second analog signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a timing chart for explaining still another example of the operation of the solid-state imaging apparatus 100 according to the embodiment of the present invention.

DESCRIPTION OF THE EMBODIMENTS

Figure 1:
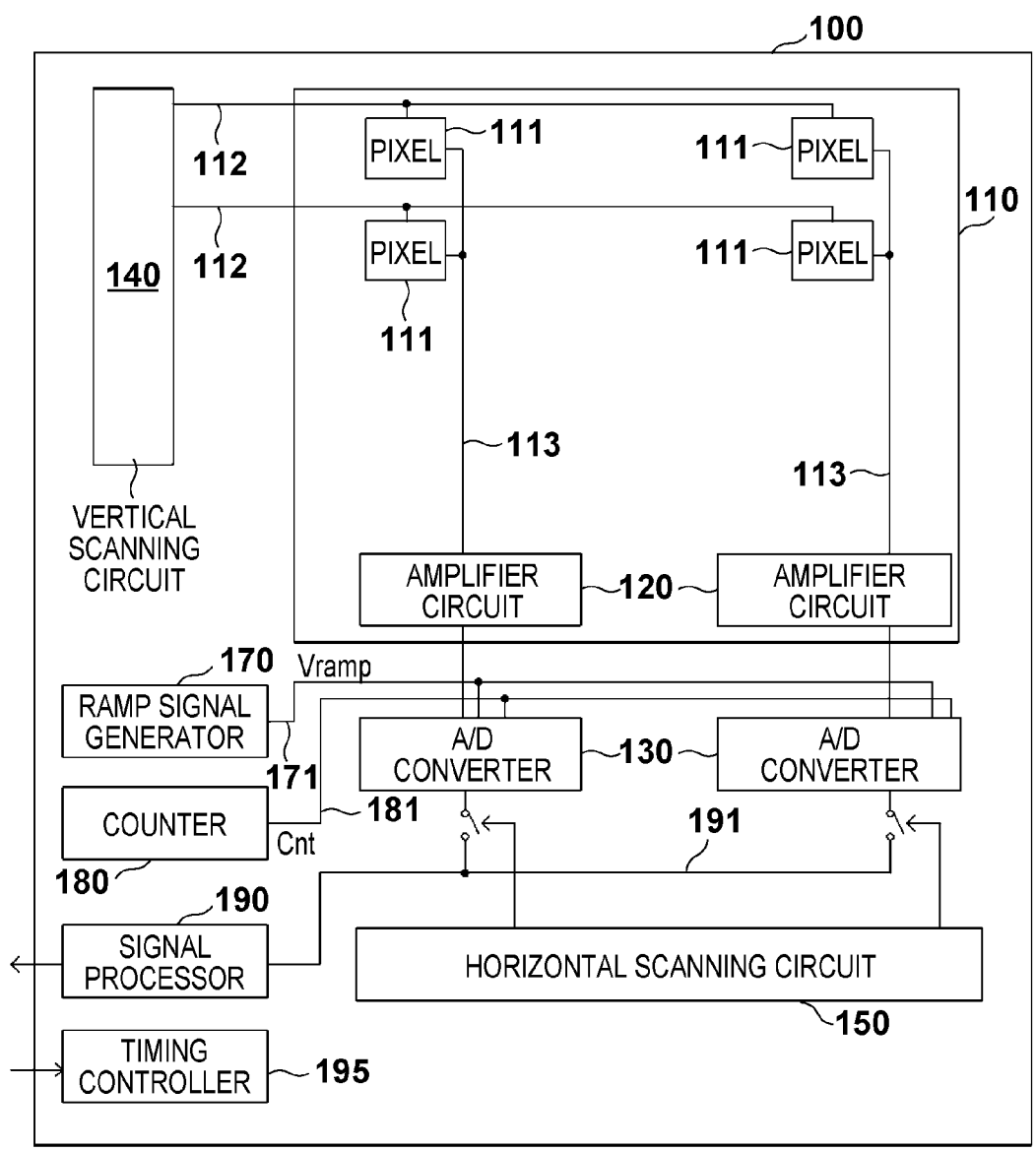
FIG. 1 is a block diagram for explaining an example of the arrangement of a solid-state imaging apparatus 100 according to an embodiment of the present invention.

An embodiment of the present invention will be described hereinafter with reference to the accompanying drawings. The same reference numerals denote the same components throughout the drawings, and a repetitive description thereof will be avoided.

An example of a schematic arrangement of a solid-state imaging apparatus 100 according to one embodiment of the present invention will be described below with reference to FIG. 1. The solid-state imaging apparatus 100 is, for example, a CMOS image sensor, which photoelectrically converts incoming light indicating an object image, and externally outputs an electrical signal obtained by the photoelectric conversion as digital data. The solid-state imaging apparatus 100 can include an analog signal generator 110 including a pixel array formed by arranging a plurality of pixels 111 in a matrix. FIG. 1 illustrates four pixels 111 for the sake of simplicity, but the number of pixels 111 is not limited to this. Each pixel 111 photoelectrically converts incoming light to the solid-state imaging apparatus 100 into an analog signal.

The solid-state imaging apparatus 100 can further include a vertical scanning circuit 140. The vertical scanning circuit 140 supplies a driving pulse signal in turn to row selection lines 112 arranged in correspondence with respective pixel rows. When the driving pulse signal is supplied to each row selection line 112, analog signals are read out from respective pixels 111 included in the corresponding pixel row onto column signal lines 113. This embodiment will handle a case in which a reset-level signal of the pixel 111 and a signal obtained by superimposing a signal according to a charge generated by the photoelectric conversion on the reset-level signal are read out from the pixel 111. A difference between these signals represents an effective pixel value. The analog signal generator 110 outputs, based on these signals, a noise signal at a reset timing and a pixel signal depending on a charge obtained by the photoelectric conversion for each pixel 111.

The analog signal generator 110 can further include amplifier circuits 120 for respective column signal lines 113. Each amplifier circuit 120 amplifies the analog signal input from the corresponding pixel 111 via the column signal line 113, and supplies the amplified analog signal to a corresponding A/D converter 130. The solid-state imaging apparatus 100 can further include A/D converters 130 in correspondence with respective column signal lines 113. Each A/D converter converts the input analog signal into digital data, and outputs the digital data.

The solid-state imaging apparatus 100 can further include a ramp signal generator 170 and counter 180. The ramp signal generator 170 generates a ramp signal Vramp which changes in a slope pattern along with an elapse of time, and supplies the generated ramp signal Vramp to the respective A/D converters 130 via a ramp signal line 171. As another embodiment, a signal source for generating another reference signal which changes temporally in place of the ramp signal may be used as the ramp signal generator 170. In this case, this reference signal is supplied to the respective A/D converters 130 via a reference signal supply line. The reference signal can use an arbitrary signal as long as it monotonically changes along with an elapse of time. An example of the reference signal includes a signal which changes step by step along with an elapse of time in addition to the aforementioned ramp signal. In this case, "monotonic change" means a change in potential without increasing in case of, for example, a monotonic decrease. The counter 180 supplies a count value Cnt to the respective A/D converters 130 via a count data line 181. As the counter 180, for example, a gray counter or binary counter may be used, and the counter 180 may have an up-down function. This embodiment will handle an example in which the plurality of A/D converters 130 share the ramp signal generator 170 and counter 180. Alternatively, each A/D converter 130 may have these components.

The solid-state imaging apparatus 100 can further include a horizontal scanning circuit 150 and signal processor 190. The horizontal scanning circuit 150 transfers digital data output from the A/D converters 130 onto a digital signal line 191 for respective columns. Digital data transferred onto the digital signal line 191 is supplied to the signal processor 190. In this embodiment, digital data corresponding to a noise signal and that corresponding to a pixel signal are read out in turn on the digital signal line 191. The signal processor 190 subtracts the digital data corresponding to the noise signal from that corresponding to the pixel signal, and externally outputs an effective pixel value.

The solid-state imaging apparatus 100 can further include a timing controller 195 which supplies pulse signals to the aforementioned components to control the operation of the solid-state imaging apparatus 100. FIG. 1 does not illustrate any signal lines used to transmit the pulse signals from the timing controller 195 to the respective components. The pulse signals supplied from the timing controller 195 will be described in detail later using timing charts to be described later.

In this embodiment, since the solid-state imaging apparatus 100 includes the amplifier circuits 120, the influences of noise components generated by the A/D converters 130 can be reduced. However, a modification of the solid-state imaging apparatus 100 may not include any amplifier circuit 120, and analog signals from the pixels 111 may be directly supplied to the A/D converters 130 via the column signal lines 113. Another modification of the solid-state imaging apparatus 100 may include CDS circuits in place of the amplifier circuits 120, and each CDS circuit may supply an analog signal obtained by subtracting a reset-level signal from a signal according to a charge generated by the pixel to the A/D converter 130. Each A/D converter converts this analog signal into digital data, and the horizontal scanning circuit 150 transfers the digital data corresponding to a pixel value of each pixel 111 to the signal processor 190. In the example shown in FIG. 1, the amplifier circuits 120, A/D converters 130, and horizontal scanning circuit 150 are arranged on one side of the pixel array. Alternatively, these components may be arranged on both the sides of the pixel array, and data may be distributed to the components on either one side for respective pixel columns.

Figure 2:
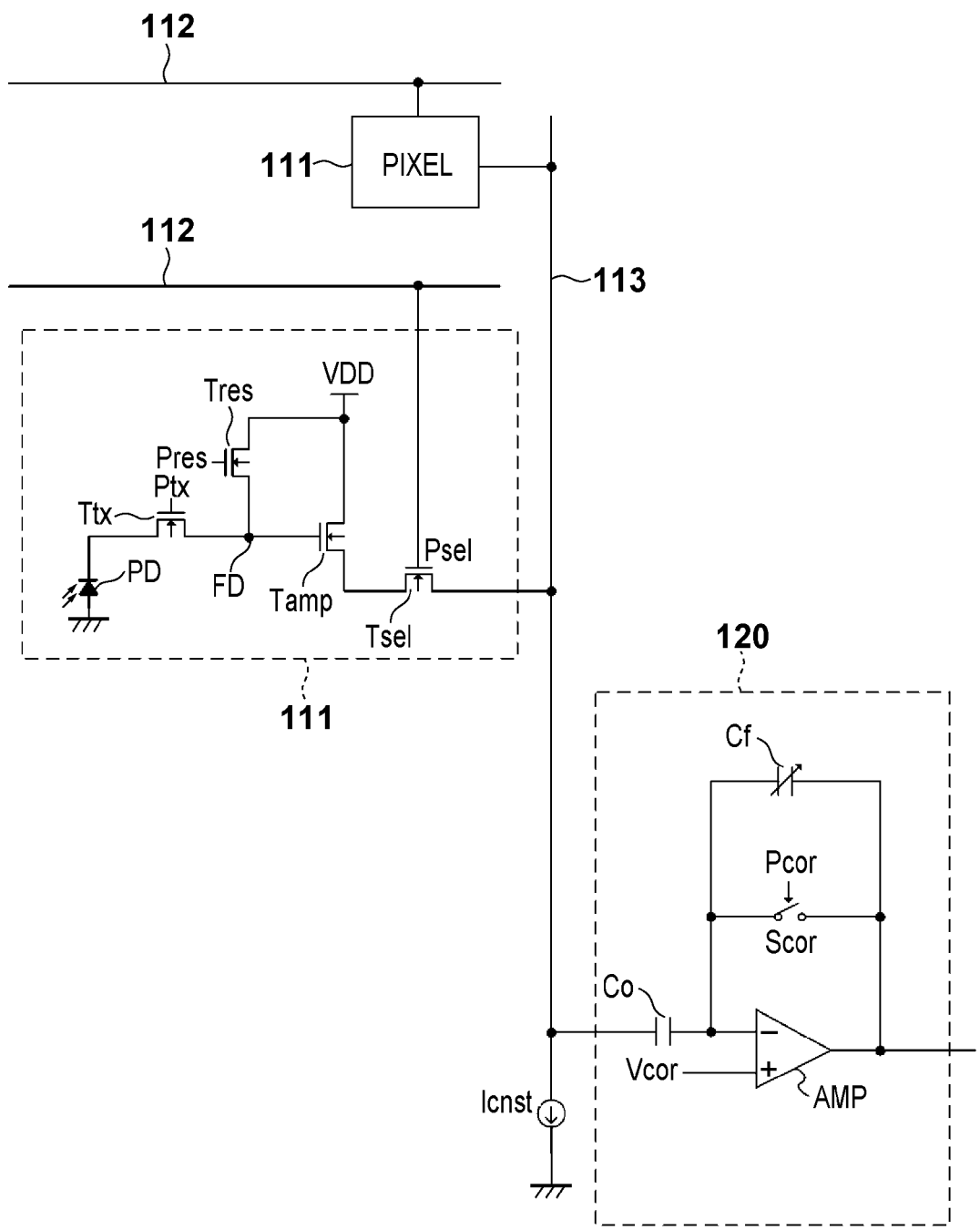
FIG. 2 is a circuit diagram for explaining an example of the arrangements of a pixel 111 and amplifier circuit 120 according to the embodiment of the present invention.

An example of schematic arrangements of the pixel 111 and amplifier circuit 120 included in the solid-state imaging apparatus 100 will be described below with reference to the equivalent circuit diagram of FIG. 2. The pixel 111 and amplifier circuit 120 may have arbitrary arrangements as long as an analog signal required for calculating a pixel value of that pixel 111 can be supplied to the A/D converter 130. The pixel 111 includes a photodiode PD required to execute the photoelectric conversion and a plurality of transistors. The photodiode PD is connected to a floating diffusion FD via a transfer transistor Ttx. The floating diffusion FD is also connected to a voltage source VDD via a reset transistor Tres, and to a gate electrode of an amplifier transistor Tamp. A first main electrode of the amplifier transistor Tamp is connected to the voltage source VDD, and a second main electrode of the amplifier transistor Tamp is connected to the column signal line 113 via a selection transistor Tsel. A gate electrode of the selection transistor Tsel is connected to the row selection line 112. When the selection transistor Tsel is turned on, the amplifier transistor Tamp operates as a source-follower circuit together with a constant current source Icnst inserted in the column signal line 113.

The amplifier circuit 120 includes illustrated circuit elements, and configures an inverting amplifier. A non-inverting input terminal of an amplifier AMP is connected to the column signal line 113 via a clamp capacitor Co, and Vcor is supplied to an inverting input terminal of the amplifier AMP. An output terminal of the amplifier AMP is connected to the A/D converter 130. A parallel circuit of a feedback capacitor Cf and switch Scor is connected between the non-inverting input terminal and output terminal of the amplifier AMP. By configuring a clamp circuit in this manner, the amplifier circuit 120 not only amplifies and outputs a signal input via the column signal line 113 by a ratio between the clamp capacitor Co and feedback capacitor Cf, but also operates a CDS circuit. As a result, as a noise signal at a pixel reset timing, an offset of the amplifier circuit 120 is output from the analog signal generator 110. Also, as a pixel signal depending on a charge obtained by the photoelectric conversion, a signal from which a reset-level signal is removed is output from the analog signal generator 110. In an embodiment in which the amplifier circuit 120 is omitted, the analog signal generator 110 outputs a reset-level signal of the pixel as a noise signal, and a signal obtained by superimposing a signal according to a charge generated by the pixel on the reset-level signal as a pixel signal. In this embodiment, noise components generated as a result of resetting of the floating diffusion FD can be reduced.

A schematic arrangement of an A/D converter 300 as an example of the A/D converter 130 shown in FIG. 1 will be described below with reference to the equivalent circuit diagram shown in FIG. 3. The A/D converter 300 can include an input terminal IN, output terminals OUTn and OUTs, comparison circuit 320, and output circuit 330. To the input terminal IN, a noise signal and pixel signal for each pixel are input in turn as analog signals. The comparison circuit 320 executes comparison based on an analog signal input to the input terminal IN and the ramp signal Vramp supplied from the ramp signal line 171, and outputs an output signal Vout of a level according to that comparison result. The output circuit 330 outputs digital data based on the output signal Vout from the comparison circuit 320 and the count value Cnt supplied from the counter 180 from the output terminal OUTn or OUTs.

The comparison circuit 320 can include a comparator CMP, capacitor Coff, and switch Sfb. The capacitor Coff can function as a correction capacitor which corrects an offset of the comparator CMP. The comparator CMP can be a differential input comparator having a non-inverting input terminal and inverting input terminal. The non-inverting input terminal ("+" terminal in FIG. 3) of the comparator CMP is connected to the input terminal IN, and the inverting input terminal ("−" terminal in FIG. 3) of the comparator CMP is connected to a first electrode (upper electrode in FIG. 3) of the capacitor Coff. A second electrode (lower electrode in FIG. 3) of the capacitor Coff is connected to the ramp signal line 171. The switch Sfb connects the output terminal and inverting input terminal of the comparator CMP.

The output circuit 330 can include four latch circuits Ln1, Ln2, Ls1, and Ls2, which store digital data. Both of a D terminal of the latch circuit Ln1 and that of the latch circuit Ls1 are connected to the count data line 181. A G terminal of the latch circuit Ln1 is connected to the output line of the comparison circuit 320 via a switch Snl, and a G terminal of the latch circuit Ls1 is connected to the output line of the comparison circuit 320 via a switch Ssl. A Q terminal of the latch circuit Ln1 is connected to a D terminal of the latch circuit Ln2, and a Q terminal of the latch circuit Ls1 is connected to a D terminal of the latch circuit Ls2. Both of a G terminal of the latch circuit Ln2 and that of the latch circuit Ls2 are connected to a signal line 331. A Q terminal of the latch circuit Ln2 is connected to the output terminal OUTn, and a Q terminal of the latch circuit Ls2 is connected to the output terminal OUTs. Since an inverting circuit is connected to the G terminals of the latch circuits Ln1 and Ls1, when the output from the comparison circuit 320 is at L level, data at the D terminals are output from the Q terminals.

Figure 4:
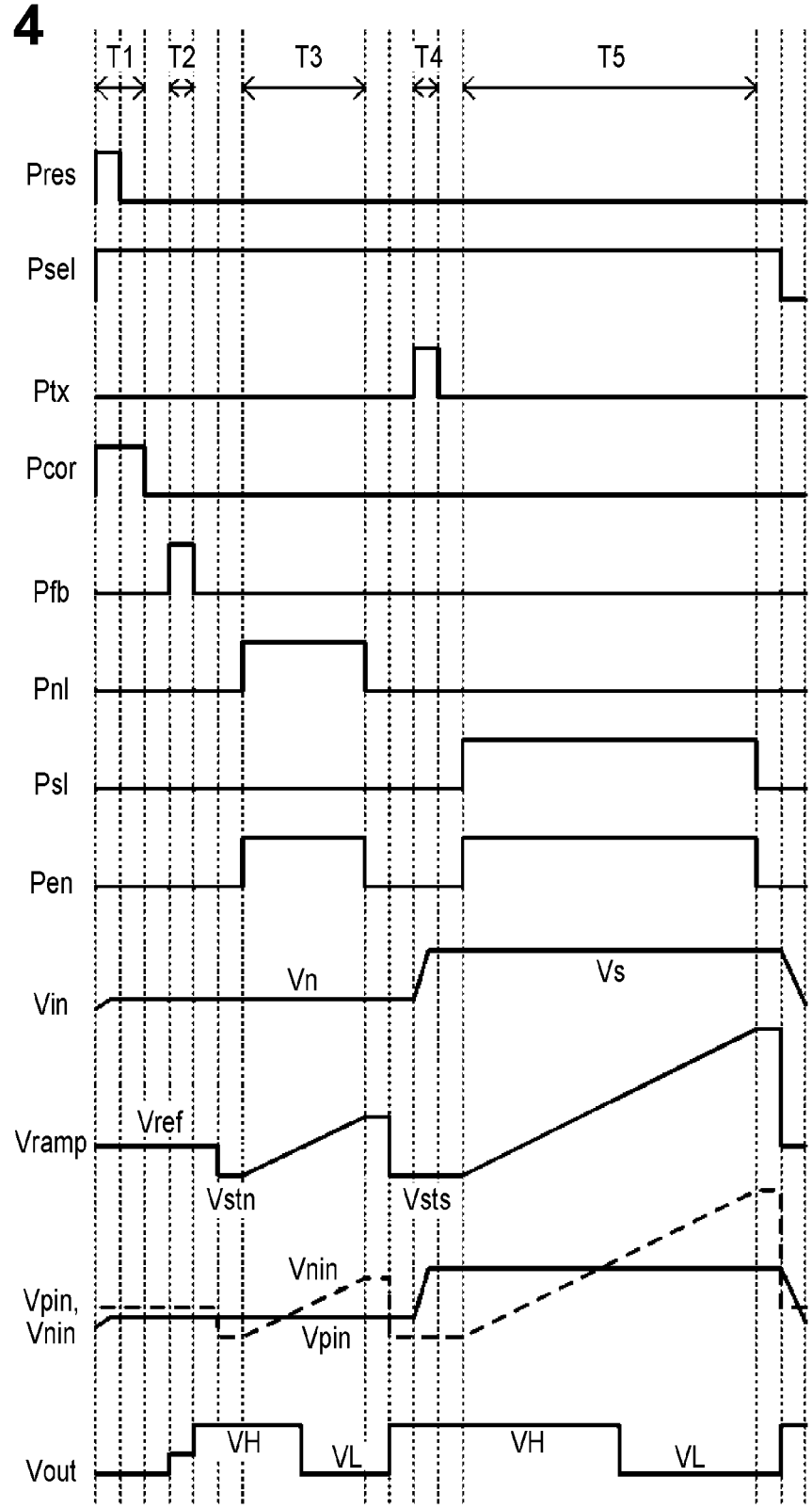
FIG. 4 is a timing chart for explaining an example of the operation of the solid-state imaging apparatus 100 according to the embodiment of the present invention.

An example of the operation of the solid-state imaging apparatus 100 having the A/D converters 300 will be described below with reference to the timing chart shown in FIG. 4. Respective pulse signals shown in FIG. 4 are generated by the timing controller 195, and are supplied to respective circuit elements in the solid-state imaging apparatus 100. That is, the timing controller 195 can control the operations of the respective components of the solid-state imaging apparatus 100. In FIG. 4, the operation of the pixel 111 of one row will be explained, but the same applies to the pixel 111 of another row. In FIG. 4, reference symbol Vpin denotes a voltage of the non-inverting input terminal of the comparator CMP; and Vnin, a voltage of the inverting input terminal of the comparator CMP. Operations of respective periods will be briefly explained. A noise signal Vn from the pixel 111 is supplied to the A/D converter 300 during a period T1, a charge of an offset voltage Voff of the comparator CMP is held in the capacitor Coff during a period T2, and the noise signal Vn is A/D-converted during a period T3. Subsequently, a pixel signal Vs from the pixel 111 is supplied to the A/D converter 300 during a period T4, and is A/D-converted during a period T5. The operations of the respective periods will be described in detail below.

At the beginning of the period T1, pulse signals Pres, Psel, and Pcor respectively go H (High level), thus turning on the reset transistor Tres, selection transistor Tsel, and switch Scor. Thus, the floating diffusion FD is reset. In this state, the amplifier transistor Tamp operates as a source-follower, and a reset-level signal of the floating diffusion FD is read out onto the column signal line 113. When the pulse signal Pcor goes L (Low level), the clamp capacitor Co holds a potential difference between Vcor and the pixel output. The output of the amplifier circuit 120 at this time is supplied to the input terminal IN of the A/D converter 300 as the noise signal Vn (first analog signal). For this reason, the voltage Vpin of the non-inverting input terminal of the comparator CMP also becomes equal to Vn. The noise signal Vn contains an offset of the amplifier circuit 120. The noise signal Vn is continuously supplied until a pulse signal Ptx goes H.

At the beginning of the period T2, a pulse signal Pfb goes H, and the switch Sfb is turned on. As a result, the inverting input terminal and output terminal of the comparator CMP are short-circuited, and the comparator CMP operates as a voltage-follower. Since the voltage Vpin of the non-inverting input terminal of the comparator CMP is Vn, the voltage Vout of the output terminal is Vn+Voff, and the voltage Vnin of the inverting input terminal is also Vn+Voff. Also, the potential of the first electrode of the capacitor Coff is Vn+Voff. During the period T2, since the voltage of the ramp signal line 171 is Vref, the potential of the second electrode of the capacitor Coff is Vref. At the end of the period T2, the pulse signal Pfb goes L, the switch Sfb is turned off, and the capacitor Coff holds Vn+Voff−Vref as a voltage across its two electrodes. Then, the A/D converter 130 is set in a ready state (that can correspond to a first state).

During an interval between the periods T2 and T3, the ramp signal generator 170 changes a voltage to be supplied onto the ramp signal line 171 to Vstn in accordance with a pulse signal (not shown) from the timing controller 195. As a result, the potential of the second electrode of the capacitor Coff becomes Vstn, and the potential of the first electrode of the capacitor Coff becomes Vn+Voff−Vref+Vstn accordingly. Since Vstn is set to be a sufficiently small value, the voltage Vnin of the inverting input terminal of the comparator CMP is lower than the voltage Vpin of the non-inverting input terminal at the beginning of the period T3. More specifically, Vstn is set to meet Vnin−Vpin<Voff. As a result, at the beginning of the period T3, the output signal Vout of the comparator CMP becomes VH. At the beginning of the period T3, a pulse signal Pen goes H, the ramp signal generator 170 begins to change the ramp signal Vramp to be supplied onto the ramp signal line 171, and the counter 180 begins to count and supplies the count value Cnt onto the count data line 181. In this embodiment, when the pulse signal Pen goes H, the ramp signal generator 170 supplies the ramp signal Vramp which begins from Vstn and increases linearly along with an elapse of time onto the ramp signal line 171. Furthermore, when a pulse signal Pnl goes H, the switch Snl is turned on. As a result, the output terminal of the comparator CMP and the G terminal of the latch circuit Ln1 are connected.

When the ramp signal Vramp begins to increase, the potential of the second electrode of the capacitor Coff increases, and that of the first electrode of the capacitor Coff increases accordingly. Then, when the voltage Vnin of the inverting input terminal of the comparator CMP becomes equal to Vn+Voff, the output signal Vout from the comparator CMP changes from VH to VL. As a result, an L-level signal is supplied to the G terminal of the latch circuit Ln1, and the count value Cnt supplied to the D terminal at that time is stored in the latch circuit Ln1 and is output from the Q terminal. The output signal Vout of the comparator CMP is inverted when the voltage Vnin of the non-inverting input terminal of the comparator CMP becomes equal to Vn+Voff. For this reason, the latch circuit Ln1 stores a count value corresponding to a time required for the voltage of the non-inverting input terminal of the comparator CMP to change from Vn+Voff−Vref+Vstn to Vn+Voff, that is, a count value corresponding to Vref−Vstn. The count value stored in the latch circuit Ln1 is digital data when the noise signal Vn as the analog signal is converted.

At the beginning of the period T4, the pulse signal Ptx goes H, and the transfer transistor Ttx is turned on. Then, a charge accumulated on the photodiode PD is transferred to the floating diffusion FD. In this state, the amplifier transistor Tamp operates as a source-follower, and a signal obtained by superimposing a signal according to the charge accumulated on the photodiode PD on the reset-level signal of the floating diffusion FD is read out onto the column signal line 113. The readout signal is amplified by the amplifier circuit 120, and is supplied to the input terminal IN of the A/D converter 300 as a pixel signal Vs (second analog signal). For this reason, the voltage Vpin of the non-inverting input terminal of the comparator CMP also becomes Vs. Since the clamp capacitor Co holds a potential difference between the pixel output during the period T1 and Vcor, the signal output from the amplifier circuit 120 ideally does not include any noise component generated upon resetting of the floating diffusion FD.

During an interval between the periods T4 and T5, the ramp signal generator 170 changes a voltage to be supplied onto the ramp signal line 171 to Vsts in accordance with a pulse signal (not shown) from the timing controller 195. As a result, the potential of the second electrode of the capacitor Coff becomes Vsts, and that of the first electrode of the capacitor Coff becomes Vn+Voff−Vref+Vsts accordingly. Since Vsts is set to be a sufficiently small value, the voltage Vnin of the inverting input terminal of the comparator CMP is lower than the voltage Vpin of the non-inverting input terminal at the beginning of the period T5. More specifically, Vsts is set to meet Vnin−Vpin<Voff. As a result, at the beginning of the period T5, the output signal Vout of the comparator CMP becomes VH. At the beginning of the period T5, the pulse signal Pen goes H, the ramp signal generator 170 begins to change the ramp signal Vramp to be supplied onto the ramp signal line 171, and the counter 180 begins to count and supplies the count value Cnt onto the count data line 181. In this embodiment, when the pulse signal Pen goes H, the ramp signal generator 170 supplies the ramp signal Vramp which begins from Vsts and increases linearly along with an elapse of time onto the ramp signal line 171. Furthermore, when a pulse signal Psl goes H, the switch Ssl is turned on. As a result, the output terminal of the comparator CMP and the G terminal of the latch circuit Ls1 are connected.

When the ramp signal Vramp begins to increase, the potential of the second electrode of the capacitor Coff increases, and that of the first electrode of the capacitor Coff increases accordingly. Then, when the voltage Vnin of the inverting input terminal of the comparator CMP becomes equal to Vs+Voff, the output signal Vout from the comparator CMP changes from VH to VL. As a result, an L-level signal is supplied to the G terminal of the latch circuit Ls1, and the count value Cnt supplied to the D terminal at that time is stored in the latch circuit Ls1 and is output from the Q terminal. The output signal Vout of the comparator CMP is inverted when the voltage Vnin of the non-inverting input terminal of the comparator CMP becomes equal to Vs+Voff. For this reason, the latch circuit Ls1 stores a count value corresponding to a time required for the voltage of the non-inverting input terminal of the comparator CMP to change from Vn+Voff−Vref+Vsts to Vs+Voff, that is, a count value corresponding to Vs−Vn+Vref−Vsts. The count value stored in the latch circuit Ls1 is digital data when the pixel signal Vs as the analog signal is converted.

After the period T5, a pulse signal mtx (not shown in FIG. 4) is supplied to the G terminals of the latch circuit Ln2 and Ls2. Then, the latch circuit Ln2 stores the output of the latch circuit Ln1 and outputs it from the output terminal OUTn. Also, the latch circuit Ls2 stores the output of the latch circuit Ls1 and outputs it from the output terminal OUTs. Then, the horizontal scanning circuit 150 reads out digital data output from the output terminals OUTn and OUTs in turn onto the digital signal line 191. The signal processor 190 calculates a difference between the digital data which represents Vs−Vn+Vref−Vsts and that which represents Vref−Vstn. With this calculation, digital data which represents Vs−Vn+Vstn−Vsts is obtained. By setting Vstn=Vsts, the signal processor 190 can acquire digital data corresponding to Vs−Vn. Alternatively, by adjusting Vstn and Vsts, an offset may be given to the digital data to be acquired by the signal processor 190.

According to the aforementioned embodiment, since a total charge of the noise signal Vn and offset voltage Voff of the comparator CMP is held in the capacitor Coff to correct the offset voltage, the circuit arrangement can be simplified. Since there is no influence of the offset voltage Voff during the A/D conversion period T3 of the noise signal Vn and the A/D conversion period T5 of the pixel signal Vs, variations of offset voltages among the A/D converters 130, which are arranged in correspondence with the respective pixel columns, need not be considered. For this reason, the A/D conversion periods T3 and T5 of the noise signal Vn and pixel signal Vs can be shortened, thus improving the frame rate and A/D conversion precision of the solid-state imaging apparatus 100. Furthermore, since the influence of the noise signal Vn can also be eliminated during the A/D conversion period of the noise signal Vn, the A/D conversion period T3 of the noise signal Vn can be further shortened.

A schematic arrangement of an A/D converter 500 as another example of the A/D converter 130 shown in FIG. 1 will be described below with reference to the equivalent circuit diagram of FIG. 5. The same reference numerals in FIG. 5 denote components common to the A/D converter 300 shown in FIG. 3, and a repetitive description thereof will be avoided. The A/D converter 500 can include an input terminal IN, output terminals OUTn and OUTs, holding circuit 510, comparison circuit 320, and output circuit 330. The holding circuit 510 samples and holds an analog signal Vin input to the input terminal IN. The comparison circuit 320 executes comparison based on the analog signal held in the holding circuit 510 and the ramp signal Vramp supplied from the ramp signal line 171, and outputs an output signal Vout of a level according to that comparison result.

The holding circuit 510 can include a capacitor Csp and switch Ssp. The capacitor Csp can function as a sampling capacitor which samples a noise signal Vn and pixel signal Vs. The switch Ssp connects the input terminal IN and comparison circuit 320. A first electrode (upper electrode in FIG. 5) of the capacitor Csp is connected to the comparison circuit 320, and a second electrode (lower electrode in FIG. 5) of the capacitor Csp is connected to the ramp signal line 171.

Figure 3:
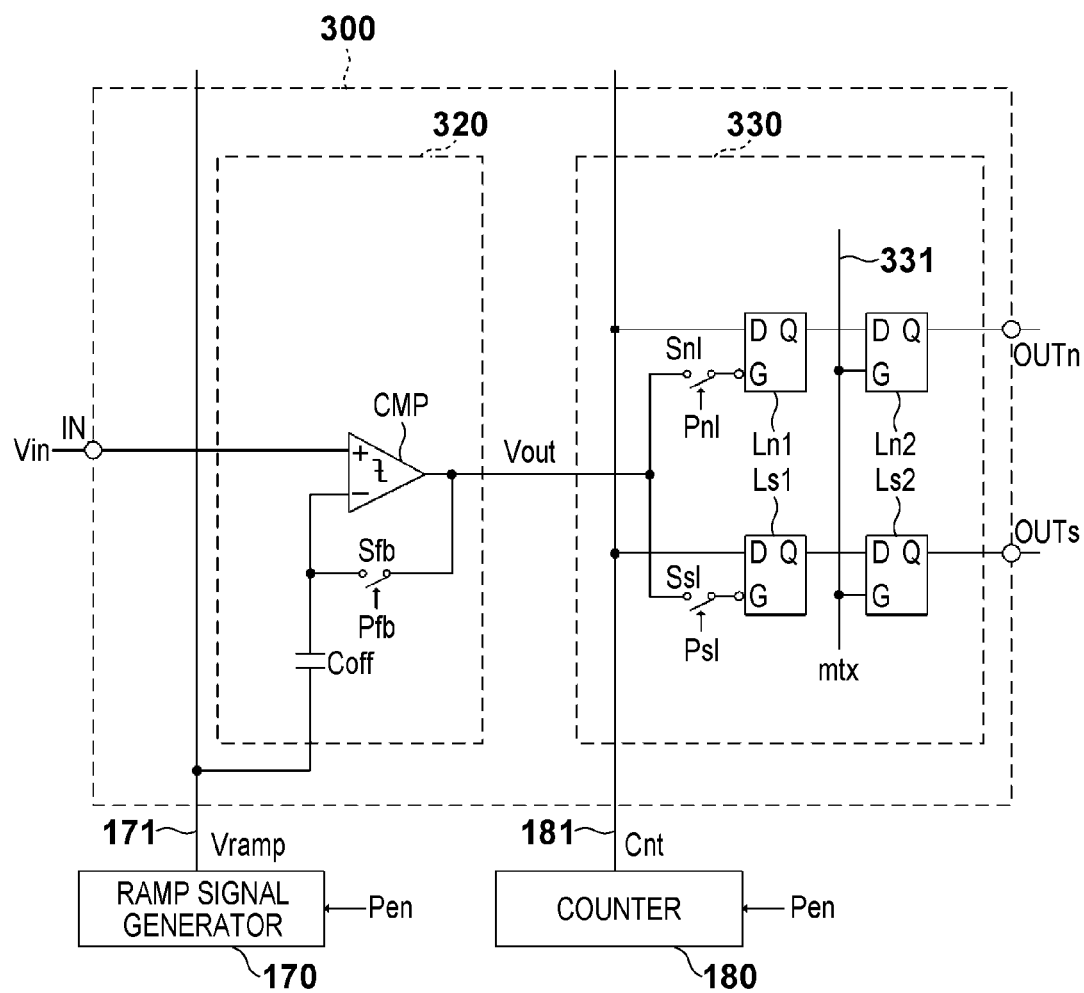
FIG. 3 is a circuit diagram for explaining an example of the arrangement of an A/D converter 300 according to the embodiment of the present invention.

Unlike in the A/D converter 300 shown in FIG. 3, in the A/D converter 500, the non-inverting input terminal of the comparator CMP of the comparison circuit 320 is connected to the holding circuit 510, and the second electrode (lower electrode in FIG. 5) of the capacitor Coff is connected to a voltage source Vcm1.

Figure 6:
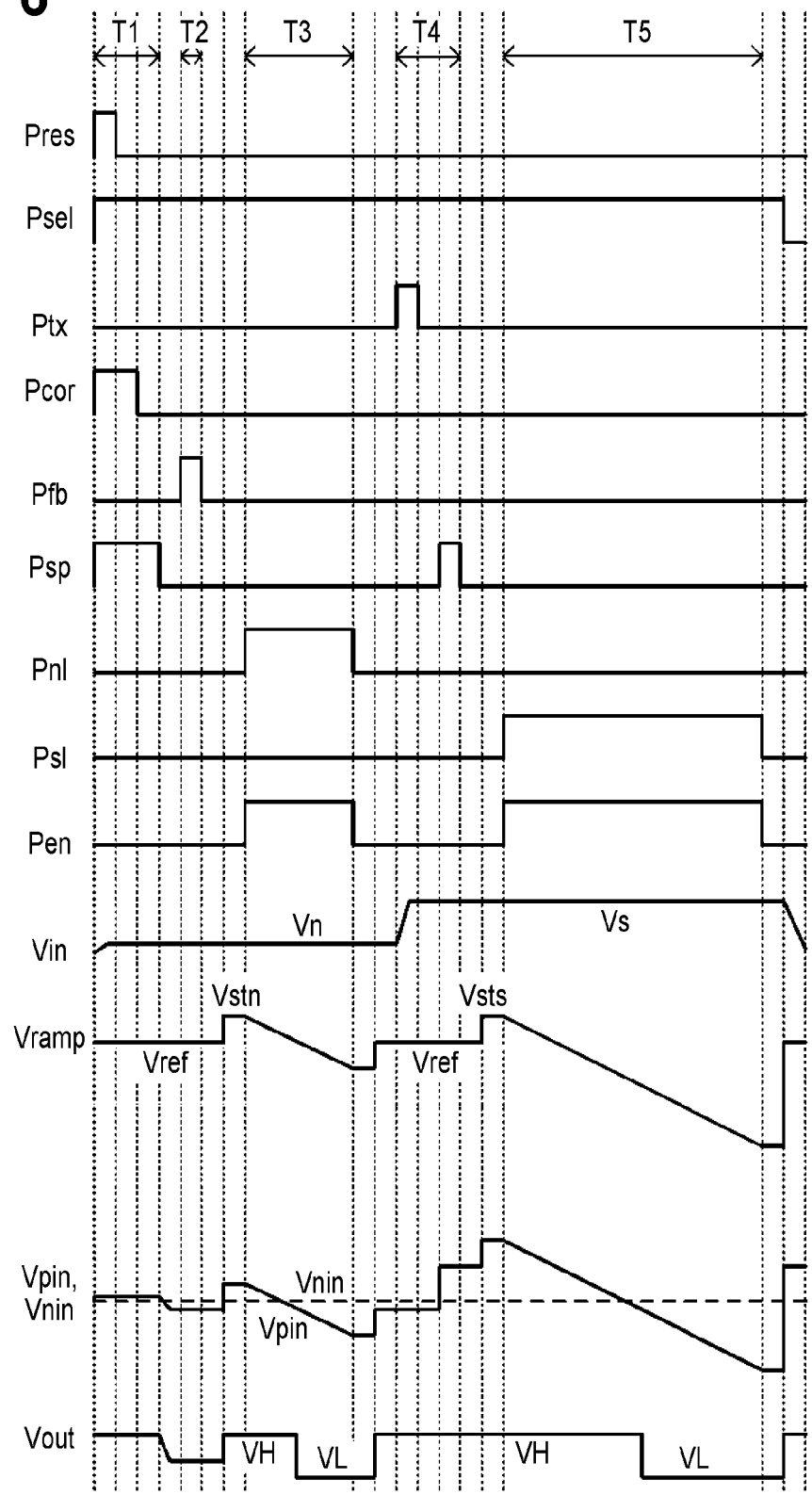
FIG. 6 is a timing chart for explaining another example of the operation of the solid-state imaging apparatus 100 according to the embodiment of the present invention.

An example of the operation of the solid-state imaging apparatus 100 having the A/D converters 500 will be described below with reference to the timing chart shown in FIG. 6. Respective pulse signals shown in FIG. 6 are generated by the timing controller 195, and are supplied to respective circuit elements in the solid-state imaging apparatus 100. In FIG. 6, the operation of the pixel 111 of one row will be explained, but the same applies to the pixel 111 of another row. In FIG. 6, reference symbol Vpin denotes a voltage of the non-inverting input terminal of the comparator CMP; and Vnin, a voltage of the inverting input terminal of the comparator CMP. Periods T1 to T5 in the timing chart of FIG. 6 correspond to the periods T1 to T5 in the timing chart of FIG. 4. The operations of the respective periods will be described in detail below.

During the period T1, as in the period T1 in the timing chart of FIG. 4, a noise signal Vn is supplied to the input terminal IN of the A/D converter 500. The noise signal Vn is continuously supplied until a pulse signal Ptx goes H. At the beginning of the period T1, a pulse signal Psp goes H, and the switch Ssp is turned on. As a result, the input terminal IN is connected to the non-inverting input terminal of the comparator CMP, and the voltage Vpin of the non-inverting terminal becomes Vn. Also, the potential of the first electrode of the capacitor Csp becomes Vn. Since the voltage of the ramp signal line 171 is Vref during period T1, the potential of the second electrode of the capacitor Csp becomes Vref. At the end of the period T1, the pulse signal Psp goes L to turn off the switch Ssp, and the capacitor Csp holds Vn−Vref as a voltage across its two electrodes.

At the beginning of the period T2, a pulse signal Pfb goes H, and the switch Sfb is turned on. As a result, the inverting input terminal and output terminal of the comparator CMP are short-circuited, and the comparator CMP operates as a voltage-follower. Since the voltage Vpin of the non-inverting input terminal of the comparator CMP is Vn, the voltage Vout of the output terminal is Vn+Voff, and the voltage Vnin of the inverting input terminal is also Vn+Voff. Also, the potential of the first electrode of the capacitor Coff is Vn+Voff. The potential of the second electrode of the capacitor Coff is fixed at Vcm1. At the end of the period T2, the pulse signal Pfb goes L to turn off the switch Sfb, and the capacitor Coff holds Vn+Voff−Vcm1 as a voltage across its two electrodes. The voltage Vnin of the inverting input terminal of the comparator CMP is maintained at Vn+Voff until the period T5 ends.

During an interval between the periods T2 and T3, the ramp signal generator 170 changes a voltage to be supplied onto the ramp signal line 171 to Vstn in accordance with a pulse signal (not shown) from the timing controller 195. As a result, the potential of the second electrode of the capacitor Csp becomes Vstn, and that of the first electrode of the capacitor Csp becomes Vn−Vref+Vstn accordingly. Since Vstn is set to be a sufficiently large value, the voltage Vnin of the inverting input terminal of the comparator is lower than the voltage Vpin of the non-inverting input terminal at the beginning of the period T3. More specifically, Vstn is set to meet Vnin−Vpin<Voff. As a result, at the beginning of the period T3, the output signal Vout of the comparator CMP becomes VH. At the beginning of the period T3, a pulse signal Pen goes H, the ramp signal generator 170 begins to change the ramp signal Vramp to be supplied onto the ramp signal line 171, and the counter 180 begins to count and supplies the count value Cnt onto the count data line 181. In this embodiment, when the pulse signal Pen goes H, the ramp signal generator 170 supplies the ramp signal Vramp which begins from Vstn and decreases linearly along with an elapse of time onto the ramp signal line 171. Furthermore, when a pulse signal Pnl goes H, the switch Snl is also turned on. As a result, the output terminal of the comparator CMP and the G terminal of the latch circuit Ln1 are connected.

When the ramp signal Vramp begins to decrease, the potential of the second electrode of the capacitor Csp decreases, and that of the first electrode of the capacitor Csp decreases accordingly. When the voltage Vpin of the non-inverting input terminal of the comparator CMP becomes equal to Vn, the output signal Vout from the comparator CMP changes from VH to VL. As a result, an L-level signal is supplied to the G terminal of the latch circuit Ln1, and the count value Cnt supplied to the D terminal at that time is stored in the latch circuit Ln1 and is output from the Q terminal. The output signal Vout of the comparator CMP is inverted when the voltage Vpin of the non-inverting input terminal of the comparator CMP becomes equal to Vn. For this reason, the latch circuit Ln1 stores a count value corresponding to a time required for the voltage of the non-inverting input terminal of the comparator CMP to change from Vn−Vref+Vstn to Vn, that is, a count value corresponding to Vref−Vstn. The count value stored in the latch circuit Ln1 is digital data when the noise signal Vn as the analog signal is converted. After the end of the period T3, the ramp signal generator 170 returns the voltage of the ramp signal line 171 to Vref.

At the beginning of the period T4, a pulse signal Ptx goes H, and a pixel signal Vs is supplied to the input terminal IN of the A/D converter 500 in the same manner as in the description of the timing chart shown in FIG. 4. In the middle of the period T4, the pulse signal Psp goes H, and the switch Ssp is turned on. As a result, the input terminal IN and the non-inverting input terminal of the comparator CMP are connected, and the voltage Vpin of the non-inverting input terminal becomes Vs. Also, the potential of the first electrode of the capacitor Csp becomes Vs. Since the voltage of the ramp signal line 171 is Vref during the period T4, the potential of the second electrode of the capacitor Csp becomes Vref. In the middle of the period T4, the pulse signal Psp goes L to turn off the switch Ssp, and the capacitor Csp holds Vs−Vref as a voltage across its two electrodes.

During an interval between the periods T4 and T5, the ramp signal generator 170 changes a voltage to be supplied onto the ramp signal line 171 to Vsts in accordance with a pulse signal (not shown) from the timing controller 195. As a result, the potential of the second electrode of the capacitor Csp becomes Vsts, and that of the first electrode of the capacitor Csp becomes Vs−Vref+Vsts accordingly. Since Vsts is set to be a sufficiently large value, the voltage Vnin of the inverting input terminal of the comparator CMP is lower than the voltage Vpin of the non-inverting input terminal at the beginning of the period T5. More specifically, Vsts is set to meet Vnin−Vpin<Voff. As a result, at the beginning of the period T5, the output signal Vout of the comparator CMP becomes VH. At the beginning of the period T5, the pulse signal Pen goes H, the ramp signal generator 170 begins to change the ramp signal Vramp to be supplied onto the ramp signal line 171, and the counter 180 begins to count and supplies the count value Cnt onto the count data line 181. In this embodiment, when the pulse signal Pen goes H, the ramp signal generator 170 supplies the ramp signal Vramp which begins from Vsts and decreases linearly along with an elapse of time onto the ramp signal line 171. Furthermore, when the pulse signal Psl goes H, the switch Ssl is turned on. As a result, the output terminal of the comparator CMP and the G terminal of the latch circuit Ls1 are connected.

When the ramp signal Vramp begins to decrease, the potential of the second electrode of the capacitor Csp decreases, and that of the first electrode of the capacitor Csp decreases accordingly. Then, when the voltage Vpin of the non-inverting input terminal of the comparator CMP becomes equal to Vn, the output signal Vout from the comparator CMP changes from VH to VL. As a result, an L-level signal is supplied to the G terminal of the latch circuit Ls1, and the count value Cnt supplied to the D terminal at that time is stored in the latch circuit Ls1 and is output from the Q terminal. The output signal Vout of the comparator CMP is inverted when the voltage Vnin of the non-inverting input terminal of the comparator CMP becomes equal to Vn. For this reason, the latch circuit Ls1 stores a count value corresponding to a time required for the voltage of the non-inverting input terminal of the comparator CMP to change from Vs−Vref+Vsts to Vn, that is, a count value corresponding to Vn−Vs+Vref−Vsts. The count value stored in the latch circuit Ls1 is digital data when the pixel signal Vs as the analog signal is converted.

After the period T5, as in the description of the timing chart of FIG. 4, the signal processor 190 calculates a difference between digital data which represents Vn−Vs+Vref−Vsts and that which represents Vref−Vstn. With this calculation, digital data which represents Vn−Vs+Vstn−Vsts is obtained. By setting Vstn=Vsts, the signal processor 190 can acquire digital data corresponding to Vs−Vn. Alternatively, by adjusting Vstn and Vsts, an offset may be given to the digital data to be acquired by the signal processor 190. When the solid-state imaging apparatus 100 includes the A/D converter 500 shown in FIG. 5, the same effects as those obtained when the solid-state imaging apparatus 100 includes the A/D converter 300 shown in FIG. 3 can be obtained.

A schematic arrangement of an A/D converter 700 as still another example of the A/D converter 130 shown in FIG. 1 will be described below with reference to the equivalent circuit diagram of FIG. 7. The same reference numerals in FIG. 7 denote components common to the A/D converter 500 shown in FIG. 5, and a repetitive description thereof will be avoided. The A/D converter 700 can include an input terminal IN, output terminals OUTn and OUTs, holding circuit 710, comparison circuit 320, and output circuit 330. The holding circuit 710 samples and holds an analog signal Vin input to the input terminal IN. The comparison circuit 320 executes comparison based on the analog signal held in the holding circuit 710 and the ramp signal Vramp supplied from the ramp signal line 171, and outputs an output signal Vout of a level according to that comparison result. The connection relationship of the comparison circuit 320 is the same as that in the A/D converter 500 shown in FIG. 5.

Figure 5:
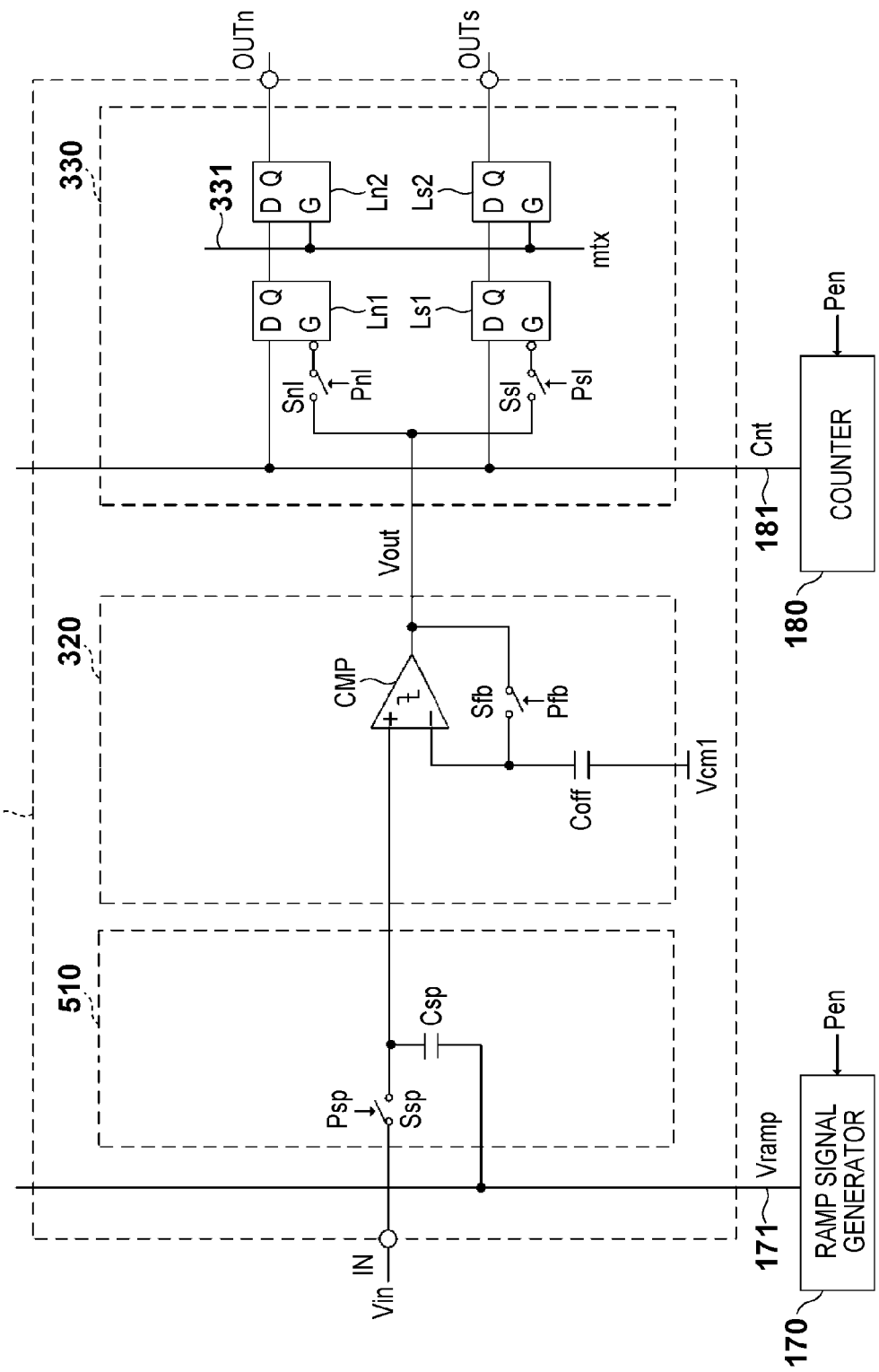
FIG. 5 is a circuit diagram for explaining an example of the arrangement of an A/D converter 500 according to the embodiment of the present invention.

Unlike in the holding circuit 510 shown in FIG. 5, the holding circuit 710 can include two capacitors, that is, capacitors Cn and Cs, and one or more switches used to switch connection destinations of these capacitors Cn and Cs. A first electrode (upper electrode in FIG. 7) of one capacitor Cn is connected to the input terminal IN via a switch Snp1 and to the comparison circuit 320 via a switch Snt2. A second electrode (lower electrode in FIG. 7) of the capacitor Cn is connected to a voltage source Vcm2 via a switch Snp2 and to the ramp signal line 171 via a switch Snt1. Likewise, a first electrode (upper electrode in FIG. 7) of the other capacitor Cs is connected to the input terminal IN via a switch Ssp1 and to the comparison circuit 320 via a switch Sst2. A second electrode (lower electrode in FIG. 7) of the capacitor Cs is connected to the voltage source Vcm2 via a switch Ssp2 and to the ramp signal line 171 via a switch Sst1. A voltage to be supplied from the voltage source Vcm2 may or may not be equal to Vref or Vcm1.

An example of the operation of the solid-state imaging apparatus 100 having the A/D converters 700 will be described below with reference to the timing chart shown in FIG. 8. Respective pulse signals shown in FIG. 8 are generated by the timing controller 195, and are supplied to respective circuit elements in the solid-state imaging apparatus 100. FIG. 8 will explain the operations of the pixel 111 (first pixel) of the n-th row and the pixel 111 (second pixel) of the (n+1)-th row, from which data are continuously read out. Digital data of the pixel 111 of the n-th row is read out to the signal processor 190 during a period T, and digital data of the pixel 111 of the (n+1)-th row is read out to the signal processor 190 during a period T'. Since the operations in the periods T and T' are the same, only a former half of the period T' is shown. Since the periods T and T' partially overlap each other, a time required for the A/D conversion can be shortened. In FIG. 8, reference symbol Vpin denotes a voltage of the non-inverting input terminal of the comparator CMP; and Vnin, a voltage of the inverting input terminal of the comparator CMP. Periods T1 to T5 in the timing chart of FIG. 8 correspond to the periods T1 to T5 in the timing chart of FIG. 6. The operations of the respective periods will be described in detail below. Since periods T1' to T3' for the pixel 111 of the (n+1)-th row are the same as periods T1 to T3 for the pixel of the n-th row, a description thereof will not be repeated.

During the period T1, as in the timing chart shown in FIG. 6, a noise signal Vn is input to the input terminal IN of the A/D converter 700. Also, at the beginning of the period T1, pulse signals Pnp1 and Pnp2 go H, and the switches Snp1 and Snp2 are turned on. As a result, the input terminal IN and voltage source Vcm2 are connected via the capacitor Cn, and the capacitor Cn holds a difference between Vcm2 and the noise signal Vn. More specifically, the potential of the first electrode of the capacitor Cn becomes equal to Vn, and that of the second electrode of the capacitor Cn becomes equal to Vcm2. After the end of the period T1, the pulse signals Pnp1 and Pnp2 go L, and the switches Snp1 and Snp2 are turned off.

At the beginning of the period T2, pulse signals Pfb and Pnt2 go H, and the switches Sfb and Pnt2 are turned on. As a result, the first electrode of the capacitor Cn is connected to the non-inverting input terminal of the comparator. Also, the inverting input terminal and output terminal of the comparator CMP are short-circuited, and the comparator CMP operates as a voltage-follower. Since the voltage Vpin of the non-inverting input terminal of the comparator CMP is Vn, the voltage Vout of the output terminal becomes Vn+Voff, and the voltage Vnin of the inverting input terminal also becomes Vn+Voff. The potential of the first electrode of the capacitor Coff becomes Vn+Voff. The potential of the second electrode of the capacitor Coff is fixed at Vcm1. At the end of the period T2, the pulse signal Pfb goes L to turn off the switch Sfb, and the capacitor Coff holds Vn+Voff−Vcm1 as a voltage across its two electrodes. The voltage Vnin of the inverting input terminal of the comparator CMP is maintained at Vn+Voff until the period T5 ends.

Next, during the period T3, the noise signal Vn is A/D-converted. During the period T3, pulse signals Pnt1 and Pnt2 go H, and the switches Snt1 and Snt2 are turned on. As a result, the non-inverting input terminal of the comparator CMP and the ramp signal line 171 are connected via the capacitor Cn. In the same manner as in the timing chart of FIG. 6, the noise signal Vn is A/D-converted.

Next, at the beginning of the period T4, a pulse signal Ptx goes H, and a pixel signal Vs is supplied to the input terminal IN of the A/D converter 700 as in the timing chart of FIG. 6. After that, in the middle of the period T4, pulse signals Psp1 and Psp2 go H, and the switches Ssp1 and Ssp2 are turned on. As a result, the input terminal IN and voltage source Vcm2 are connected via the capacitor Cs, and the capacitor Cs holds a difference between Vcm2 and the pixel signal Vs. More specifically, the potential of the first electrode of the capacitor Cs becomes equal to the pixel signal Vs, and that of the second electrode of the capacitor Cs becomes equal to Vcm2. After the end of the period T4, the pulse signals Psp1 and Psp2 go L, and the switches Ssp1 and Ssp2 are turned off.

Next, during the period T5, the pixel signal Vs is A/D-converted. During the period T5, pulse signals Pst1 and Pst2 go H, and the switches Pst1 and Pst2 are turned on. As a result, the non-inverting input terminal of the comparator CMP and ramp signal line 171 are connected via the capacitor Cs, and the pixel signal is A/D-converted as in the timing chart shown in FIG. 6.

Figure 7:
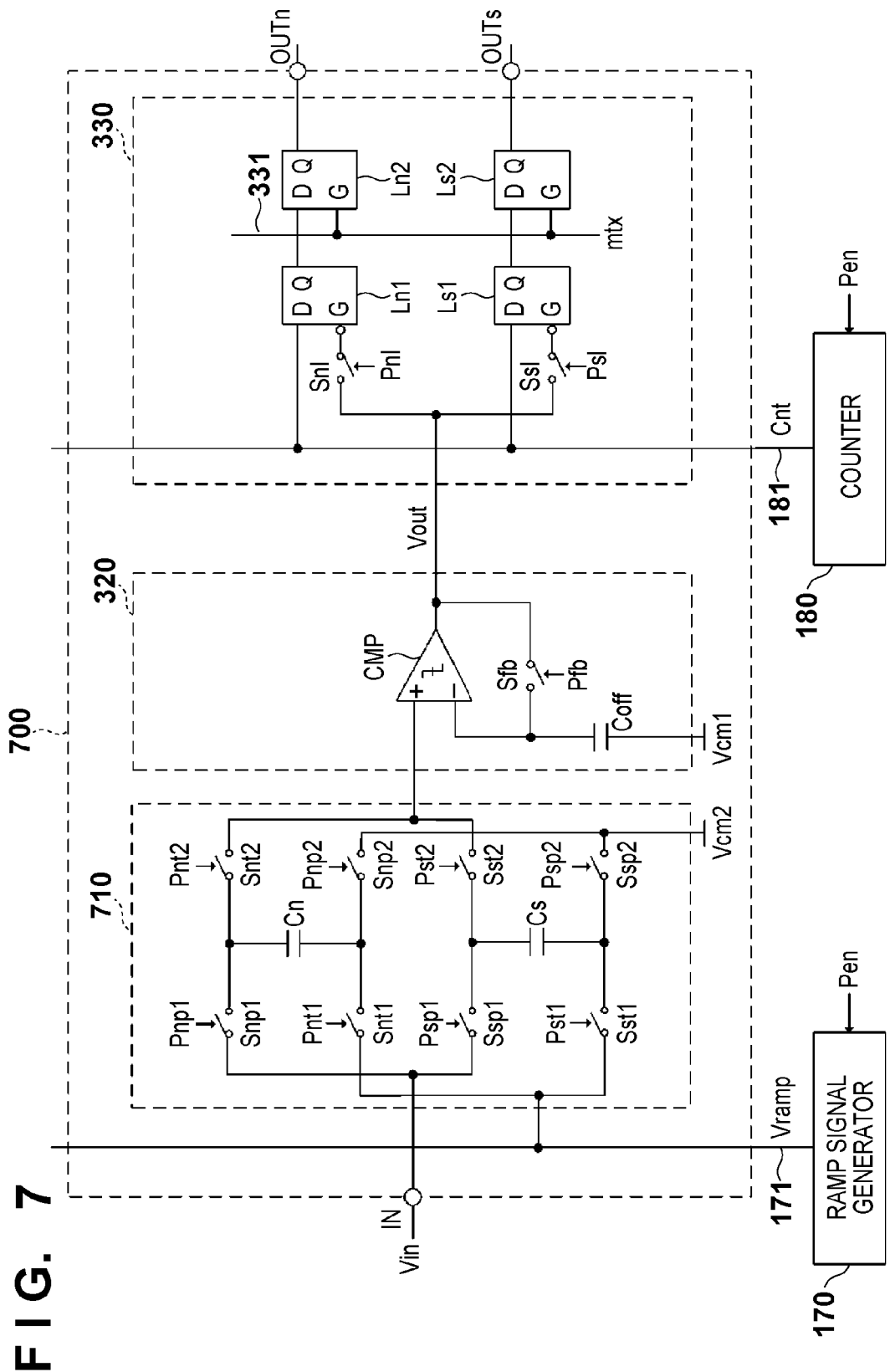
FIG. 7 is a circuit diagram for explaining an example of the arrangement of an A/D converter 700 according to the embodiment of the present invention.

When the solid-state imaging apparatus 100 has the A/D converter 700 shown in FIG. 7, the same effects as those obtained when the solid-state imaging apparatus 100 has the A/D converter 300 shown in FIG. 3 can be obtained. As shown in the timing chart of FIG. 8, in this embodiment, the A/D conversion period T5 of the pixel signal Vs of the pixel 111 of the n-th row overlaps a holding period T1' of a noise signal Vn' of the pixel 111 of the (n+1)-th row. Thus, the overall A/D conversion period required for the pixels 111 of the solid-state imaging apparatus 100 can be shortened. Also, by controlling the A/D converter 700 so as not to simultaneously connect the capacitors Cn and Cs to a common circuit arrangement, crosstalk via a common impedance can be reduced. Since Vcm2 is supplied to the capacitor Cs while the ramp signal Vramp is supplied to the capacitor Cn, crosstalk due to capacitive coupling can also be reduced. Therefore, the solid-state imaging apparatus 100 having the A/D converters 700 can attain imaging operations at a high frame rate in which interlinear crosstalk can be eliminated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-202335, filed Sep. 15, 2011, which is hereby incorporated by reference herein in its entirety.

What is claimed is:

1. An A/D converter comprising:
   an input terminal for inputting an analog signal;
   a reference signal line for connecting to a signal source that generates a reference signal which changes temporally;
   a comparator which includes a non-inverting input terminal, an inverting input terminal, and an output terminal, and outputs, from the output terminal, an output signal according to a comparison result between a voltage supplied to the non-inverting input terminal and a voltage supplied to the inverting input terminal;
   a correction capacitor connected to the inverting input terminal of said comparator; and
   an output circuit which outputs digital data corresponding to the analog signal input to said input terminal,
   wherein in a first state in which a total charge of a first analog signal and an offset voltage of said comparator is held in said correction capacitor, a second analog signal input to said input terminal is supplied to the non-inverting input terminal of said comparator, and the second analog signal supplied to the non-inverting input terminal of said comparator or the total voltage held in said correction capacitor is changed using the reference signal, thereby outputting, from said output circuit, digital data depending on a time from the beginning of the change until the output signal of said comparator changes as digital data corresponding to the second analog signal.

2. The A/D converter according to claim 1, wherein in the first state, the first analog signal is supplied to the non-inverting input terminal of said comparator, and the first analog signal supplied to the non-inverting input terminal of said comparator or the total charge held in said correction capacitor is changed using the reference signal, thereby further outputting, from said output circuit, digital data depending on a time from the beginning of the change until the output signal of said comparator changes as digital data corresponding to the first analog signal.

3. The A/D converter according to claim 1, further comprising:
   a switch which connects the inverting input terminal and the output terminal of said comparator,
   wherein the first analog signal is supplied to the non-inverting input terminal of said comparator in a state in which said switch is ON, and said switch is turned off after the total voltage is held in said correction capacitor, thereby setting the first state.

4. The A/D converter according to claim 1, wherein the reference signal is a ramp signal.

5. The A/D converter according to claim 1, wherein said correction capacitor includes a first electrode and a second electrode,
   the first electrode of said correction capacitor is connected to the inverting input terminal of said comparator, and
   the reference signal is supplied to the second electrode of said correction capacitor in the first state, thereby changing the total charge held in said correction capacitor.

6. The A/D converter according to claim 1, further comprising:
   a sampling capacitor which includes a first electrode connected to the non-inverting input terminal of said comparator, and a second electrode,
   wherein in the first state in which the second analog signal is further held in said sampling capacitor, the reference signal is supplied to the second electrode of said sampling capacitor, thereby changing the second analog signal supplied to the non-inverting input terminal of said comparator.

7. The A/D converter according to claim 6, wherein said A/D converter comprises two sampling capacitors equivalent to said sampling capacitor, and
   one sampling capacitor holds the first analog signal, and the other sampling capacitor holds the second analog signal.

8. A solid-state imaging apparatus comprising:
   an A/D converter of claim 1;
   an analog signal generator which has a plurality of pixels, and generates pixel signals depending on charges obtained by photoelectric conversion for respective pixels; and
   a controller which supplies the pixel signal to said A/D converter as the second analog signal, and controls said A/D converter to output digital data corresponding to the pixel signal.

9. The apparatus according to claim 8, wherein each of the plurality of pixels further generates a noise signal at a pixel reset timing, and
   said controller supplies the noise signal to said A/D converter as the first analog signal.

10. The apparatus according to claim 8, wherein said analog signal generator further comprises an amplifier circuit which amplifies a signal from the pixel, and
    said amplifier circuit generates the noise signal based on a reset-level signal of the pixel supplied from the plurality of pixels, and generates the pixel signal based on a signal obtained by superimposing a signal according to a charge generated by photoelectric conversion on the reset-level signal.

11. The apparatus according to claim 8, wherein said A/D converter is arranged for each pixel column of the pixel array.

* * * * *